United States Patent
Yoshida

(10) Patent No.: US 7,526,042 B2
(45) Date of Patent: Apr. 28, 2009

(54) OFDM SYSTEM RECEIVER APPARATUS SUPPRESSING INTER-SYMBOL INTERFERENCE

(75) Inventor: Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 10/995,814

(22) Filed: Nov. 22, 2004

(65) Prior Publication Data
US 2006/0029143 A1 Feb. 9, 2006

(30) Foreign Application Priority Data
Aug. 4, 2004 (JP) ............................. 2004-228346

(51) Int. Cl.
*H04K 1/10* (2006.01)
(52) U.S. Cl. .................. 375/285; 375/386; 375/260; 375/348; 370/210; 370/485; 370/208
(58) Field of Classification Search ................ 375/260, 375/348, 299, 232, 135, 148, 133, 285, 386; 370/208, 485, 210
See application file for complete search history.

(56) References Cited

U.S. PATENT DOCUMENTS

| | | | | |
|---|---|---|---|---|
| 6,993,083 | B1 * | 1/2006 | Shirakata et al. ............ | 375/260 |
| 7,313,189 | B2 * | 12/2007 | Yoshida et al. .............. | 375/260 |
| 2004/0001563 | A1 * | 1/2004 | Scarpa ........................ | 375/326 |
| 2004/0091057 | A1 * | 5/2004 | Yoshida ...................... | 375/260 |

FOREIGN PATENT DOCUMENTS

| | | |
|---|---|---|
| JP | 2003-218826 | 7/2003 |
| KR | 10-2004-0041498 | 5/2004 |

OTHER PUBLICATIONS

Korean Office Action mailed Mar. 28, 2006, with translation.
Satoshi Suyama, et al. An OFDM Receiver with Smoothed FFT-Window and RLS-MLSE for Fast Multipath Fading Environments with Large Delay Spread. IEEE 7th Int. Symp. On Spread-Spectrum Tech. & Appl. Sep. 2-5, 2002 p. 353-357.

* cited by examiner

*Primary Examiner*—Chieh M. Fan
*Assistant Examiner*—Eva Puente
(74) *Attorney, Agent, or Firm*—Katten Muchin Roseman LLP

(57) ABSTRACT

An OFDM receiver includes an inter-symbol interference suppressing unit to modify to a predetermined content a portion of a dominant wave included in a received signal and a predetermined content a portion of at least one delayed wave included in the received signal, a tentative demodulation unit to demodulate a signal including the unmodified dominant wave and the modified delayed wave to output a tentatively demodulated target symbol, and an inter-carrier interference suppressing unit, that includes first and second units to respectively further modify in response to the tentatively demodulated target symbol, the modified portion of the modified delayed wave, and the modified portions of the dominant wave and of the modified delayed wave, and a selecting unit to select one of the first and second units in response to a delay profile.

10 Claims, 12 Drawing Sheets

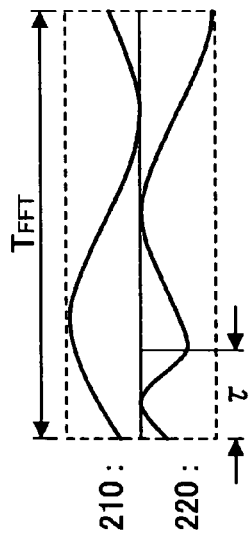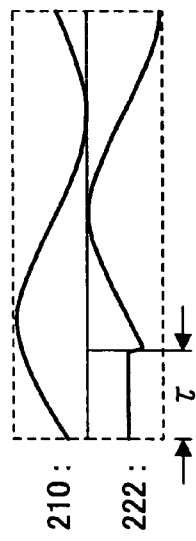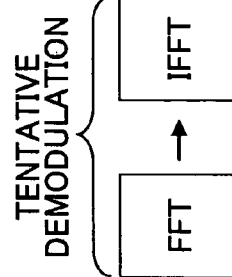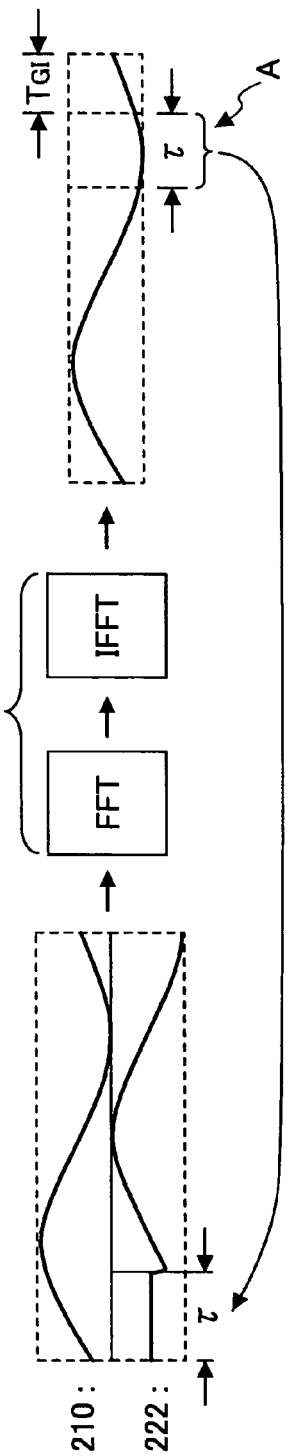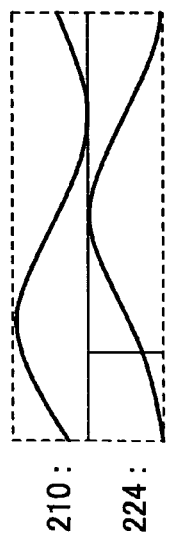
FIG.3A  FIG.3B  FIG.3C  FIG.3D

OFDM SYSTEM RECEIVER APPARATUS SUPPRESSING INTER-SYMBOL INTERFERENCE

CROSS-REFERENCE TO RELATED APPLICATIONS

The present application is based upon and claims the benefit of priority from the prior Japanese Patent Application No. 2004-228346 filed on Aug. 4, 2004, with the Japanese Patent Office, the entire contents of which are incorporated herein by reference.

BACKGROUND OF THE INVENTION

1. Field of the Invention

The present invention generally relates to a technology for demodulating received signals, and particularly relates to a receiver apparatus based on an orthogonal frequency division multiplexing (OFDM) system.

2. Description of the Related Art

In the broadband wireless communications (next-generation mobile communications) that are currently researched in the technical field as identified above, there is a need to take into account multipath propagation environment when constructing a system. The multicarrier modulation method utilizes a plurality of subcarriers for a predetermined transmission band to transmit signals in parallel, thereby reducing the effect of frequency-selective fading, which becomes a problem especially in the multipath propagation environment. The OFDM system inserts a guard interval (GI) between effective symbols. This serves to effectively suppress inter-symbol interference with respect to multipath delayed waves that have delays shorter than the length of the guard interval, thereby providing for demodulation without equalization. Multipath fading can thus be effectively dealt with.

The delay (delay spread) of a delayed wave relative to a preceding wave increases depending on the communication environment. Such delay could be 0.2 through 2.0 microseconds in urban areas. In mountain areas or valleys, the delay could reach 10 through 20 microseconds, for example. In consideration of this, the guard interval should be set to such a sufficiently long length that all the delayed waves following the preceding wave fall within the range of the guard interval.

Since the guard interval is also a redundant symbol, however, it is preferable to avoid a drop in transmission efficiency while keeping the sufficient length of the guard interval. To this end, the length of the entirety of OFDM symbols needs to be increased so as to keep a ratio of the effective symbols to the guard interval above a certain level. If the length of OFDM symbols is increased, however, fading becomes inconstant within the duration of a single OFDM symbol, which results in weaker resiliency against fading. Further, an increase in the length (Ts) of an OFDM symbol results in a decrease in the subcarrier interval ($\Delta f=1/Ts$). This means weaker resiliency against a Doppler shift. Further, a ratio of a peak to an average power also increases, resulting in the degradation of performances caused by nonlinear distortion. In consideration of this, the guard interval is generally set to a decent length, and another measure is taken to deal with delayed waves arriving with delays exceeding the length of the guard interval.

In order to suppress inter-symbol interference (ISI) affecting the entirety of the utilized band, Non-patent Document 1 performs filtering in the time domain at a portion that triggers interference at the time of FFT (Fast Fourier Transform) during demodulation, thereby performing maximum likelihood sequence estimation (MLSE). A method of this kind is also described in Patent Document 1.

[Patent Document 1] Japanese Patent Application Publication No. 2003-218826

[Non-patent Document 1] Suyama, et al., "An OFDM Receiver with Smoothed FFT-Window and RLS-MLSE for Fast Multipath Fading Environments with Large Delay Spread", IEEE 7th Int. Symp. on Spread-Spectrum Tech. & Appl., Prague, Czech Republic, Sep. 2-5, 2002, pp. 353-357

The methods as disclosed in Patent Document 1 and Non-patent Document 1 require a Viterbi equalizer that has M2 states for each subcarrier (M: the number of modulation levels). Because of this, these methods are not preferred from the viewpoint of a need to reduce circuit size, computation size, power consumption, costs, etc. Especially, these methods are disadvantageous for use in portable communications equipment that is required to be small.

Further, a method of this kind makes a hard decision with respect to signal points by use of maximum likelihood sequence estimation (MLSE) With respect to the certainness of signal points, therefore, likelihood information or soft decision information is not effectively utilized. Accordingly, such method fails to sufficiently utilize error correction techniques, and is disadvantageous from the viewpoint of the accuracy of received signal estimation.

Accordingly, there is a need for a receiver apparatus that can reduce inter-symbol interference (ISI) caused by delayed waves arriving with delays exceeding the guard interval of OFDM symbols.

SUMMARY OF THE INVENTION

It is a general object of the present invention to provide a receiver apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a receiver apparatus particularly pointed out in the specification in such full, clear, concise, and exact terms as to enable a person having ordinary skill in the art to practice the invention.

To achieve these and other advantages in accordance with the purpose of the invention, the invention provides an receiver apparatus according to an OFDM system, which includes a inter-symbol interference suppressing unit configured to modify to a predetermined content a portion of a dominant wave included in a received signal and to modify to a predetermined content a portion of at least one delayed wave included in the received signal, a tentative demodulation unit configured to demodulate a signal inclusive of the modified dominant wave and the modified delayed wave or inclusive of the unmodified dominant wave and the modified delayed wave according to the OFDM system so as to output a tentatively demodulated target symbol, and an inter-carrier interference suppressing unit, wherein the inter-carrier interference suppressing unit includes a first unit configured to further modify the modified portion of the modified delayed wave in response to the tentatively demodulated target symbol, a second unit configured to further modify the modified portion of the modified dominant wave and the modified portion of the modified delayed wave in response to the tentatively demodulated target symbol, and a selecting unit configured to select one of the first unit and the second unit in response to a delay profile.

According to at least one embodiment of the invention, provision is made to reduce inter-symbol interference and inter-carrier interference caused by delayed waves arriving with delays exceeding the guard interval of OFDM symbols.

BRIEF DESCRIPTION OF THE DRAWINGS

Other objects and further features of the present invention will be apparent from the following detailed description when read in conjunction with the accompanying drawings, in which:

FIGS. 3A through 3D are illustrative drawings showing a dominant wave and a delayed wave with respect to a single subcarrier component;

DESCRIPTION OF THE PREFERRED EMBODIMENTS

Figure 1:
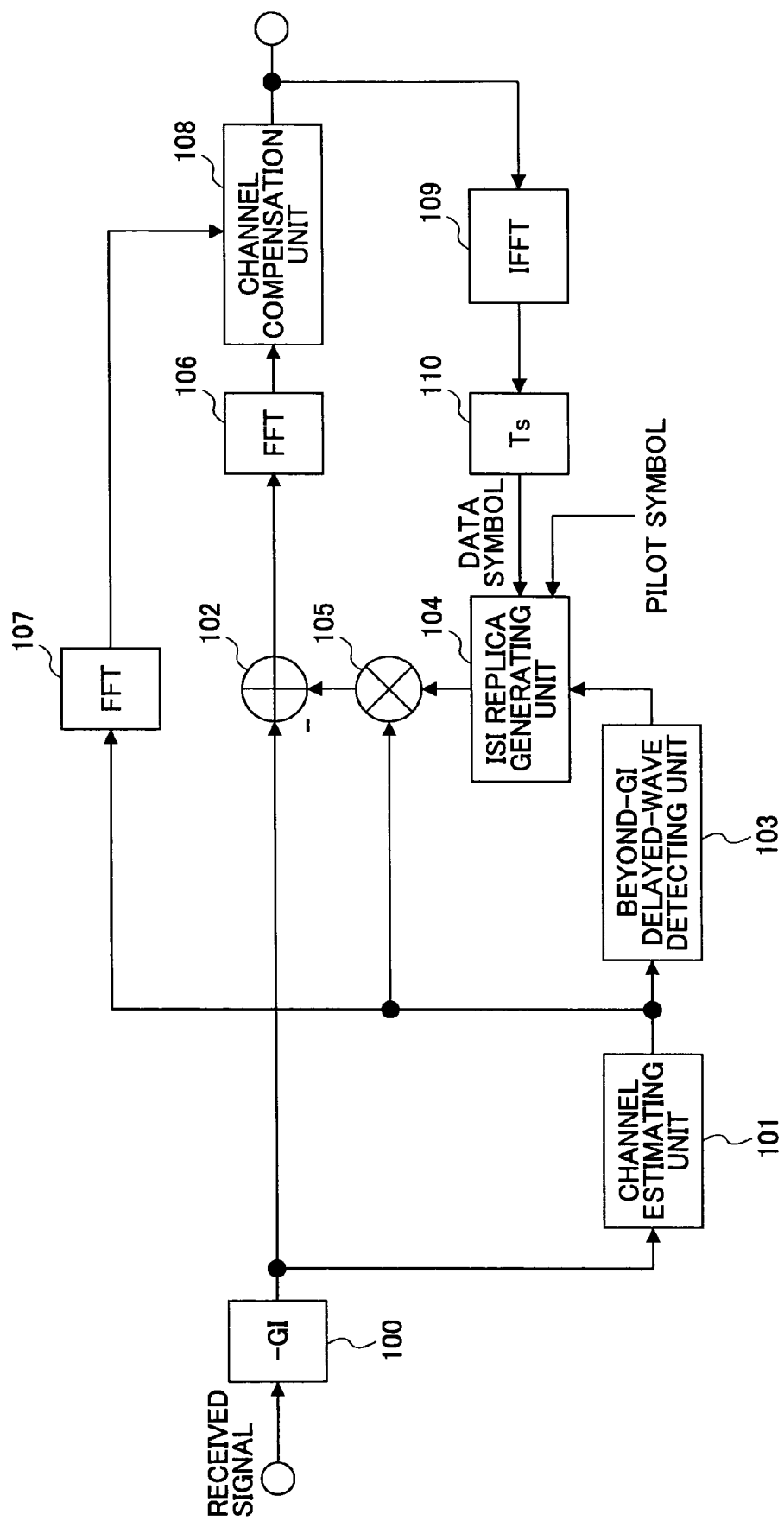
FIG. 1 is a block diagram showing a portion of a receiver apparatus of the OFDM system that removes inter-symbol interference.

In the following, embodiments of the present invention will be described with reference to the accompanying drawings.

A receiver apparatus of the OFDM system according to an embodiment of the present invention uses a delayed-wave reconstructing method or all-path reconstructing method to suppress inter-symbol interference and inter-carrier interference (ICI) caused by the removal thereof. In the delayed-wave reconstructing method, a portion of a preceding symbol adjacent to a target symbol among delayed waves in the received signals is modified to a predetermined content, and the modified portion is further modified by the tentatively demodulated target symbol. In the all-path reconstructing methods, a portion of a target symbol subject to demodulation among a dominant wave and delayed waves in the received signals is modified to a predetermined content, and the modified portion is further modified by the tentatively demodulated target symbol. A choice of either one of the methods is made based on the delay profile.

With this provision, inter-carrier interference is suppressed by use of a method suitable for communication environment.

According to one embodiment of the present invention, a ratio of the power of desired waves to the power of undesired waves in the received signals is compared with a threshold, and a method of suppressing inter-carrier interference is selected based on the result of comparison. If the power of undesired waves is less than half the total power of received signals, for example, the delayed-wave reconstructing method is chosen. If the power of undesired waves exceeds half the total power of received signals, the all-path reconstructing method is chosen. Such signal powers are readily derivable from the delay profile, so that the size of additional circuit elements and a cost increase necessary for implementing the invention can be kept small.

According to one embodiment of the present invention, an averaging means is provided to average out a delay profile for provision to the selecting means as described above. With this provision, the threshold value is modified according to the statistical tendency of the delay profile.

According to one embodiment of the present invention, a means is provided to select switch timing among the start timings of a dominant wave and delayed waves where the switch timing indicates the timing at which a ratio of the power of desired waves to the total power exceeds the threshold value. For example, the delayed-wave reconstructing method is chosen to demodulate samples from such switch timing to the start timing of the maximum delayed wave. Also, the all-path reconstructing method is chosen to demodulate samples prior to such switch timing. This provides for a simple check method to select a proper inter-carrier interference suppressing method.

In the following, embodiments of the present invention will be described with respect to (1) inter-symbol interference removal, (2) inter-carrier interference removal (mode 1), (3) inter-carrier interference removal (mode 2), and (4) inter-carrier interference removal (mode 3). Throughout the drawings, the same elements are referred to by the same numerals.

(1) Inter-Symbol Interference Removal

FIG. 1 is a block diagram showing a portion of a receiver apparatus of the OFDM system that removes inter-symbol interference. This is based on the technology disclosed in Japanese Patent Application No. 2003-44519. The receiver apparatus includes a guard interval removing unit (-GI) 100, a channel estimating unit 101, a subtracting unit 102, a beyond-GI delayed-wave detecting unit 103, an ISI replica generating unit 104, a multiplying unit 105, fast Fourier transform units (FFT) 106 and 107, a channel compensation unit 108, an inverse fast Fourier transform unit (IFFT) 109, and a delay unit (Ts) 110.

The guard interval removing unit 100 removes the guard interval from a received signal for provision to the subtracting unit 102 and the channel estimating unit 101.

The channel estimating unit 101 calculates correlation between a pilot signal stored in memory beforehand and a pilot signal included in the received signal, thereby outputting a channel estimation value and delay profile with respect to the received signal.

The beyond-GI delayed-wave detecting unit 103 checks the delays of a dominant wave (e.g., the $1^{st}$-arrival path) and the one or more following delayed waves (paths), and discriminate the delayed waves having delays within the range of the guard interval relative to the dominant wave from other delayed waves. The delay waves having delays exceeding the guard interval are reported to the ISI replica generating unit 104.

The ISI replica generating unit 104 extracts a portion of a preceding symbol ahead of a target symbol currently subjected to demodulation, and outputs the extracted portion. This portion is extracted from the symbol that is obtained by modulating the preceding symbol already demodulated by the OFDM system.

The multiplying unit 105 multiplies the output of the ISI replica generating unit 104 by a proper weighting factor for provision to the subtracting unit 102. The weighting factor is the channel estimation value.

The subtracting unit 102 subtracts the output of the multiplying unit 105 from the received signal.

The fast Fourier transform unit 106 performs the fast Fourier transform on the signal supplied from the subtracting unit 102, thereby carrying out demodulation according to the OFDM system.

The fast Fourier transform unit 107 performs the fast Fourier transform on the channel estimation value to obtain channel estimation values for the respective subcarriers.

Based on the output of the fast Fourier transform unit 107, the channel compensation unit 108 attends to channel compensation on a per-subcarrier basis with respect to the received signal demodulated by the OFDM system. With this provision, a demodulated symbol that is properly compensated for is obtained.

The inverse fast Fourier transform unit 109 performs the inverse fast Fourier transform on the demodulated symbol, thereby carrying out OFDM modulation. The modulated symbol is properly delayed by the delay unit 110 for provision to the ISI replica generating unit 104 where it is used for the purpose of suppressing inter-symbol interference with respect to a symbol following the demodulated symbol.

Figure 2:
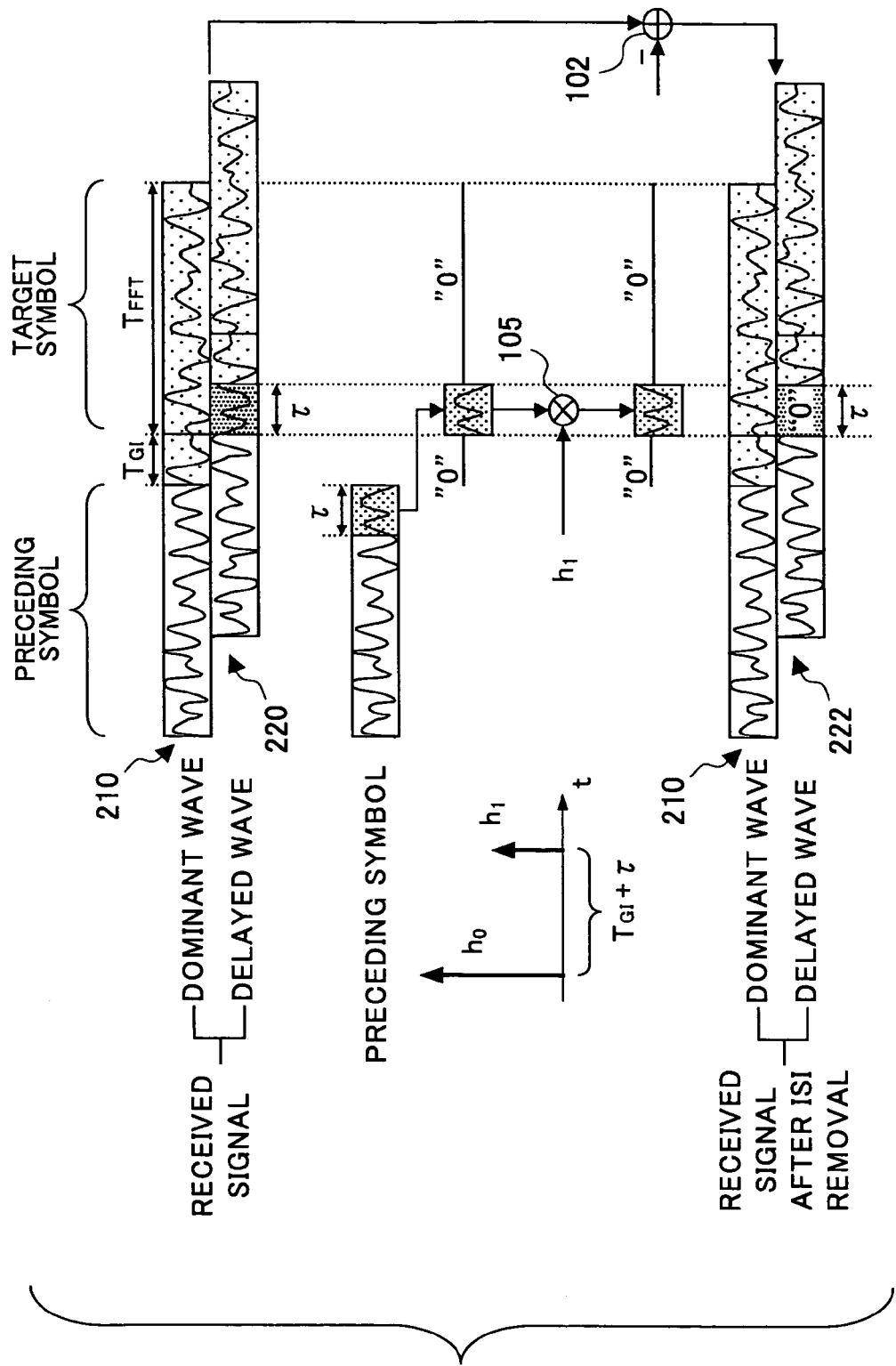
FIG. 2 is an illustrative drawing for explaining the way that inter-symbol interference is removed.

Operations will be described with reference to FIG. 2. For the sake of simplicity, it is assumed that the received signal includes only two waves (two paths), i.e., a dominant wave 210 and a delayed wave 220 that arrives with a delay exceeding a guard interval $T_{GI}$. The invention is not limited to this example, and is applicable to a configuration having any number of paths. The total delay of the delayed wave is represented as $T_{GI}+\tau$. Such received signal is received by the receiver apparatus, and the guard interval is removed by the guard interval removing unit 100 for provision to the subtracting unit 102. As illustrated, a symbol subject to OFDM demodulation is referred to as a "target symbol", and a symbol preceding this target symbol is referred to as a "preceding symbol". Each symbol has a signal length equivalent to a duration $T_{FFT}$, which corresponds to the window width of the fast Fourier transform. As illustrated, part (as shown by $\tau$) of the preceding symbol of the delayed wave overlaps the target symbol of the dominant wave, which causes inter-symbol interference (ISI).

A series of symbols included in the received signal are successively demodulated, so that the demodulation of the preceding symbol is already completed when the target symbol is about to be modulated. That is, the preceding symbol is already output from the channel compensation unit 108 of FIG. 1. The inverse fast Fourier transform unit 109 and the delay unit 110 modulates the demodulated preceding symbol according to the OFDM system, thereby generating the preceding symbol in the time domain. The ISI replica generating unit 104 extracts a portion of this second-time modulated preceding symbol (i.e., the portion of the "preceding symbol" indicated by $\tau$ in FIG. 2) for provision to the multiplying unit 105. As shown in FIG. 2, the multiplying unit 105 multiplies the extracted portion of the preceding symbol by a channel estimation value $h_1$ obtained from the delay profile. The channel estimation values of the dominant wave 210 and the delayed wave 220 are represented as $h_0$ and $h_1$, which are generally complex numbers. The output signal of the multiplying unit 105 has the same waveform as the portion of the delayed wave 220 in the received signal that causes inter-symbol interference at the time of demodulating the target symbol. When the subtracting unit 102 subtracts the output of the multiplying unit 105 from the received signal, the signal portion of the delayed wave that is indicated by $\tau$ is cancelled. This signal portion after cancellation is equal to "0". This sufficiently prevents the portion indicated by $\tau$ from causing inter-symbol interference to the target symbol.

FIGS. 3A through 3D are illustrative drawings showing a dominant wave and a delayed wave with respect to a single subcarrier component. FIG. 3A shows a signal supplied to one input of the subtracting unit 102, and FIG. 3B shows a signal output from the subtracting unit 102. As shown in FIG. 3A, inter-symbol interference occurs due to the portion of the preceding symbol of the delayed wave 220 as indicated by $\tau$. As shown in FIG. 3B, the signal portion of the preceding symbol of the delayed wave 220 is cancelled, so that a delayed wave 222 includes only a target symbol. As a result, inter-symbol interference observed in the case of FIG. 3A is effectively suppressed.

When the delayed wave is modified as shown in FIG. 3B to suppress inter-symbol interference, distortion may occur at the time of demodulation because information about the subcarrier becomes nil with respect to the $\tau$ portion of the delayed wave. In other words, orthogonality between the subcarriers is not preserved, thereby creating inter-carrier interference (ICI). A method of removing such inter-carrier interference will be described in the following.

(2) Inter-Carrier Interference Removal (Mode 1)

Figure 4:
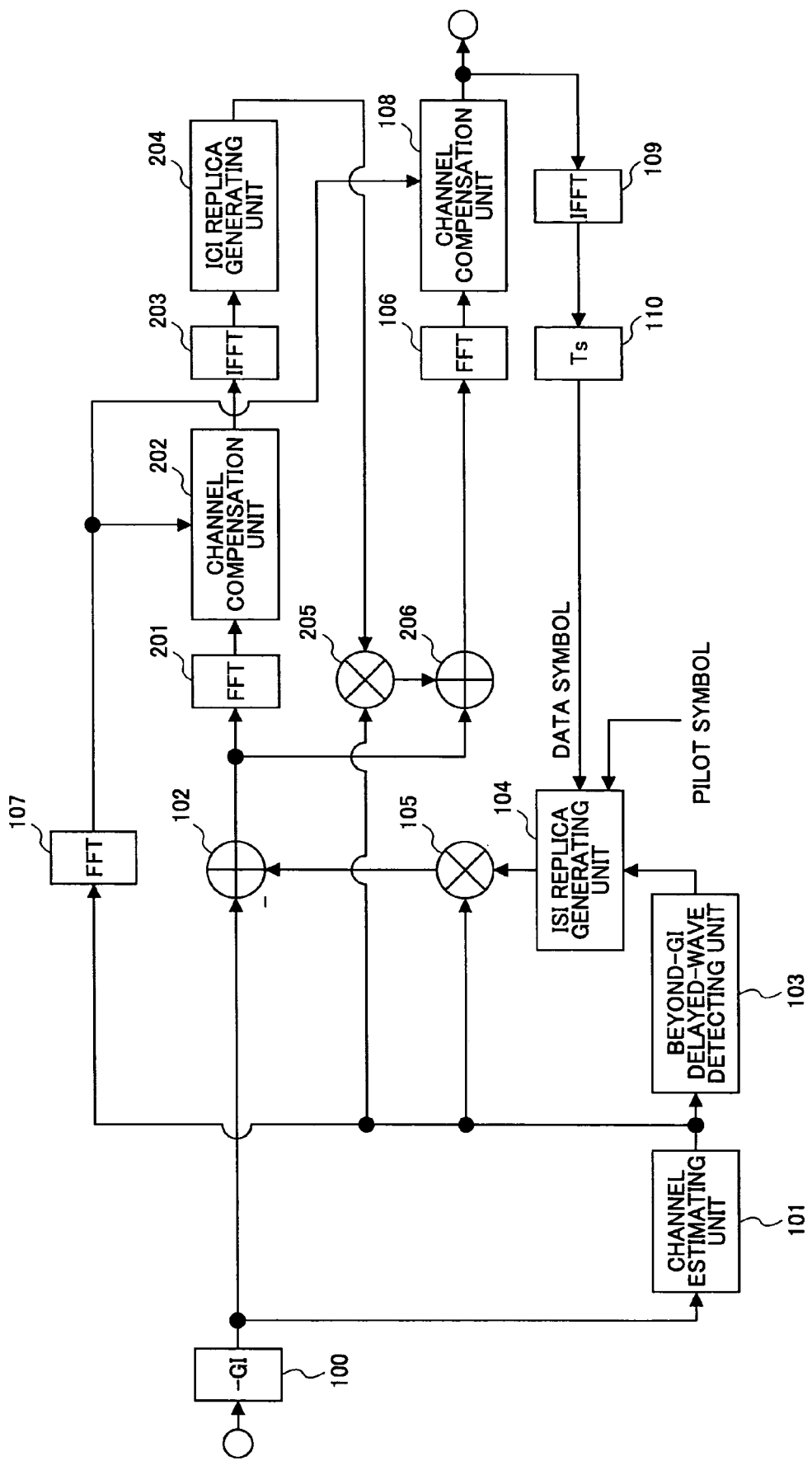
FIG. 4 is a block diagram of a receiver apparatus that removes inter-symbol interference and inter-carrier interference.

FIG. 4 is a block diagram of a receiver apparatus that removes inter-symbol interference and inter-carrier interference. This is based on the technology disclosed in Japanese Patent Application No. 2003-44519. In addition to the elements described in connection with FIG. 1, the receiver apparatus includes a fast Fourier transform unit 201, a channel compensation unit 202, a inverse fast Fourier transform unit 203, an ICI replica generating unit 204, a multiplying unit 205, and an adding unit 206. The elements that have already been described with reference to FIG. 1 will not be further described.

The fast Fourier transform unit 201 performs the fast Fourier transform on the signal supplied from the subtracting unit 102, thereby carrying out demodulation according to the OFDM system.

The fast Fourier transform unit 107 performs the fast Fourier transform on the channel estimation value to obtain channel estimation values for the respective subcarriers. The channel estimation values are supplied to the channel compensation units 108 and 202.

Based on the output of the fast Fourier transform unit 107, the channel compensation unit 202 attends to channel compensation on a per-subcarrier basis with respect to the received signal demodulated by the OFDM system. With this provision, a demodulated (tentatively demodulated) symbol under the influence of inter-carrier interference is obtained.

The inverse fast Fourier transform unit 203 performs the inverse fast Fourier transform on the channel-compensated signal (tentatively demodulated target symbol), thereby bringing it back to the time domain.

The ICI replica generating unit 204 extracts a portion of the tentatively demodulated target symbol for provision to the multiplying unit 205.

The multiplying unit 205 multiplies the output of the ICI replica generating unit 204 by a proper weighting factor (channel estimation value) for provision to the adding unit 206.

The adding unit 206 adds up the output of the subtracting unit 102 and the output of the multiplying unit 205, and supplies the sum to the fast Fourier transform unit 106. This signal is subjected to the fast Fourier transform and channel estimation, and is then output from the channel compensation unit 108 as a demodulated symbol with reduced ICI.

Figure 5:
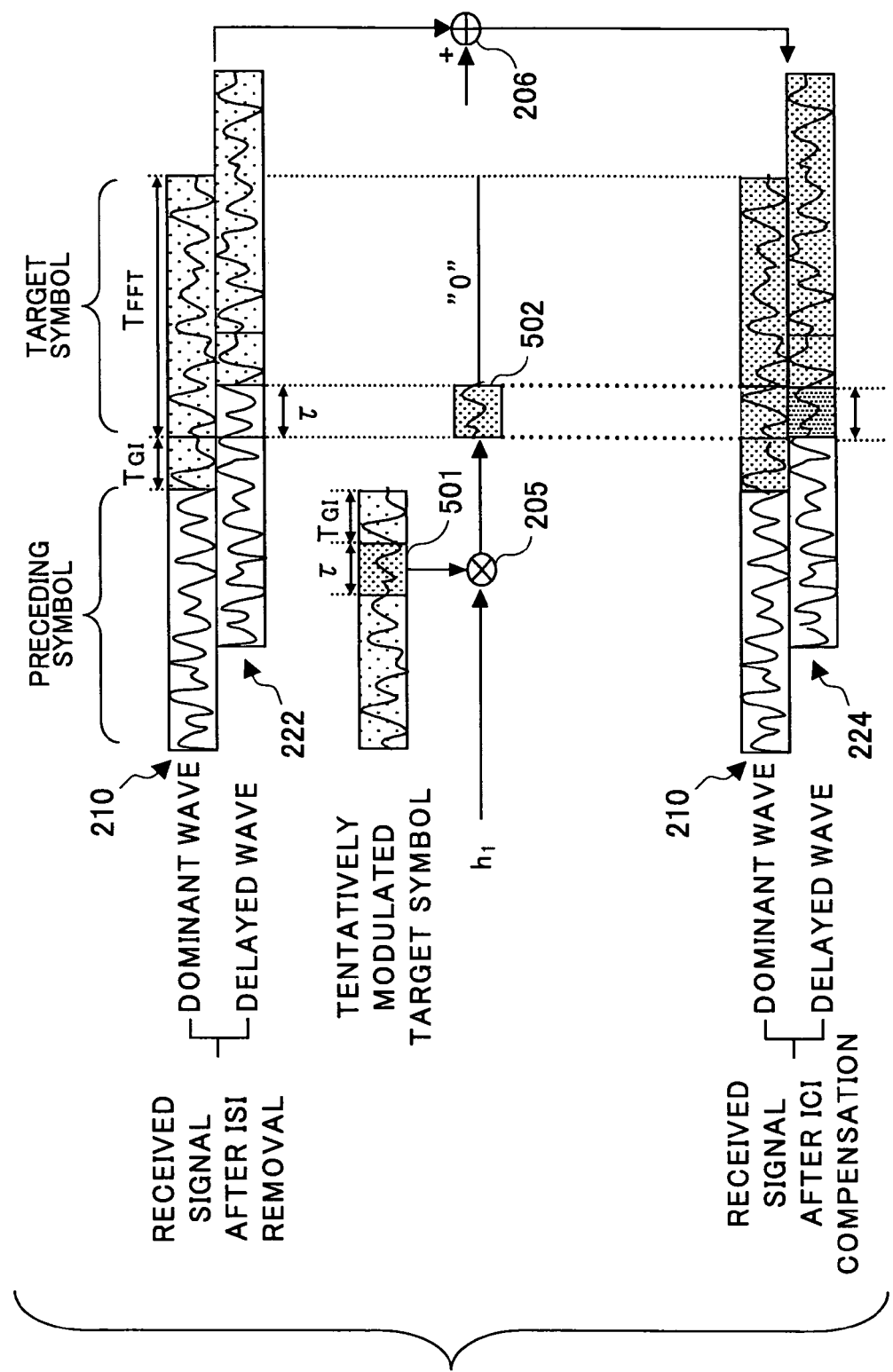
FIG. 5 is an illustrative drawing for explaining the way that inter-carrier interference is removed.

Operation will be described with reference to FIG. 5. In FIG. 5, the signal shown as a "received signal after ISI removal" corresponds to the output of the subtracting unit 102, and is equal to what is shown at the bottom of FIG. 2. In the delayed wave 222, the portion indicated by τ is modified to "0". A signal that contains the delayed wave 222 and the dominant wave 210 is demodulated according to the OFDM system by the fast Fourier transform unit 201 and the channel compensation unit 202. As previously described, the output of the subtracting unit 102 includes inter-carrier interference. This tentatively demodulated target symbol is modulated again by the inverse fast Fourier transform unit 203 to become a target symbol in the time domain. The ICI replica generating unit 204 extracts a portion of the tentatively demodulated target symbol. This portion that is subject to extraction is indicated by τ as shown in the "tentatively demodulated target symbol" in FIG. 5. Namely, the portion to be extracted is a portion 501 that falls within a range τ+$T_{GI}$ situated at the end of the target symbol but falls outside the range $T_{GI}$ provided at the end. The extracted portion is supplied to the multiplying unit 205, and is multiplied by the channel estimation value $h_1$. The adding unit 206 then adds the output of the subtracting unit 102 to this extracted and weighted signal portion 502. With this provision, the portion of the delayed wave 222 that was turned into "0" is given more proper subcarrier information, thereby reducing inter-carrier interference. Thereafter, the fast Fourier transform unit 106 and the channel compensation unit 108 perform their respective functions, thereby outputting a more correctly demodulated target symbol.

The way the inter-carrier interference is removed will be further described with reference to FIG. 3. As was previously described, the output of the subtracting unit 102 is shown in FIG. 3B. This output is tentatively demodulated, so that a portion τ as indicated by an arrow "A" is obtained for extraction as shown in FIG. 3C. The extracted portion is weighted by the channel estimation value for addition to the delayed wave 222, thereby further modifying the delayed wave 222. As shown in FIG. 3D, both the dominant wave 210 and the delayed wave 224 contain meaningful information for the entire duration $T_{FFT}$ with respect to the subcarrier in question. In FIG. 3B, information regarding the subcarrier was not meaningful subcarrier information at some portion of the delayed wave. With the signal processing as described here, it is possible to suppress inter-carrier interference.

(3) Inter-Carrier Interference Removal (Mode 2)

In the examples (1) and (2) described above, a portion of the delayed wave is modified to "0", and this portion is further modified by using the tentatively demodulated target symbol. The present invention is not limited to such a mode. A portion of the dominant wave in addition to the delayed wave may be modified to "0", and this modified portion may be further modified by using a tentatively demodulated target symbol.

Figure 6:
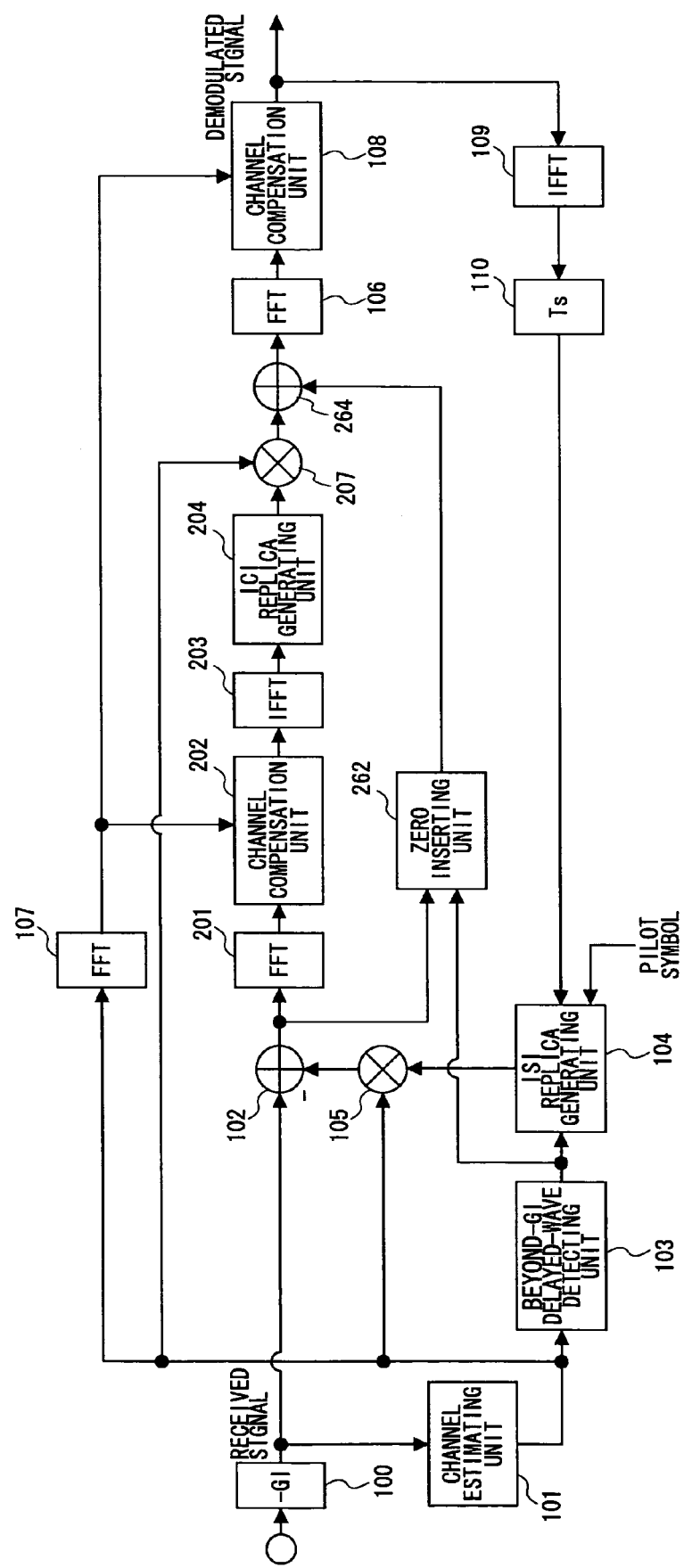
FIG. 6 is a block diagram showing a portion of a receiver apparatus.

FIG. 6 is a block diagram showing a portion of a receiver apparatus. This is based on the technology disclosed in Japanese Patent Application No. 2003-44519. This receiver apparatus removes inter-symbol interference and inter-carrier interference. In addition to the elements described in connection with FIG. 1 and FIG. 4, the receiver apparatus includes a zero inserting unit ("0" insertion) 262, a multiplying unit 207, and an adding unit 264. Those elements which have already been described will not be further described. Also, the modifying of a portion of the delayed wave has been described in connection with FIG. 4 and FIG. 5, and a description thereof will be omitted.

The zero inserting unit 262 modifies to "0" a portion of the dominant wave 210 contained in the signal from the subtracting unit 102. This modified portion is located in the same period as the modified signal portion of the delayed wave 222 (FIG. 2).

The multiplying unit 207 multiplies the output of the ICI replica generating unit 204 by a weighting factor equal to the channel estimation value. As will be described later, not only the delayed wave but also the dominant wave is subjected to weighting multiplication.

The adding unit 264 adds up the output of the zero inserting unit 262 and the output of the multiplying unit 207 for provision to the fast Fourier transform unit 106, which has already been described.

Figure 7:
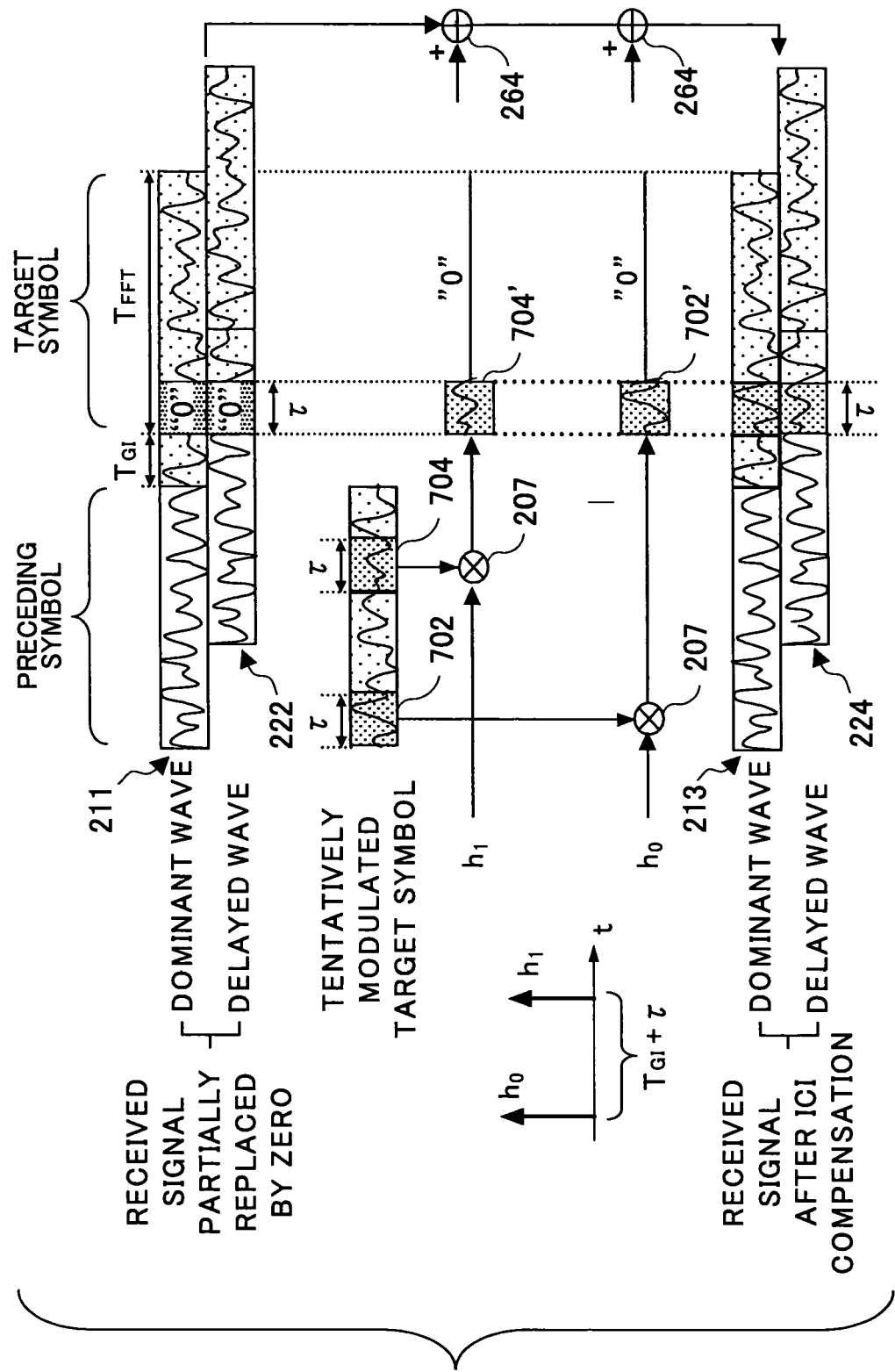
FIG. 7 is an illustrative drawing for explaining the way that inter-carrier interference is removed.

Operations will be described with reference to FIG. 7 and FIG. 6. The output of the zero inserting unit 262 includes a dominant wave 211 and the delayed wave 222 as shown as "received signal partially replaced by zero" in FIG. 7. The target symbol that is tentatively demodulated by the fast Fourier transform unit 201 and the channel compensation unit 202 is turned back into a time domain signal by the inverse fast Fourier transform unit 203. The ICI replica generating unit 204 extracts portions of this signal. The portions to be extracted are shown as 702 and 704 in FIG. 7. The signal portion 702 corresponds to a "0" portion of the dominant wave 211. The signal portion 704 corresponds to a "0" portion of the delayed wave 222. These portions are supplied to the multiplying unit 207 for weighting multiplication by the respective channel estimation values $h_0$ and $h_1$ corresponding to the dominant wave and the delayed wave. Modified signal portions 702' and 704' are supplied to the adding unit 264. The output of the multiplying unit 207 is added to the output of the zero inserting unit 262, thereby obtaining a signal in which the "0" signal portion is further modified. Namely, the "0" signal portion of the dominant wave 211 has the signal portion 702' added thereto, and the "0" signal portion of the delayed wave 222 has the signal portion 704' added thereto. As a result, the adding unit 264 outputs a signal having a dominant wave 213 and a delayed wave 224 as shown at the bottom of FIG. 7. With this provision, the portions of the dominant wave and delayed wave that were replaced by "0" are given more proper subcarrier information, thereby reducing inter-carrier interference. Thereafter, the fast Fourier transform unit 106 and the channel compensation unit 108 perform their functions, thereby outputting more correctly demodulated target symbol.

(4) Inter-Carrier Interference Removal (Mode 3)

The method of suppressing inter-carrier interference as described in (2) (hereinafter referred to as a "delayed-path reconstructing method" for the sake of convenience) modifies a portion of a delayed wave having a delay exceeding the guard interval, but does not modify the dominant wave. Accordingly, this method is particularly advantageous when the power of the dominant wave is predominant while the power of delayed waves is small. For example, it is advantageous when the delay profile has a series of delayed waves or paths following the dominant wave having their power attenuating exponentially. Under the communication environment in which such a delay profile is observed, it is not preferable to employ the method of suppressing inter-carrier interference as described in (3) (hereinafter referred to as an "all-path reconstructing method" for the sake of convenience). The method described in (3) modifies to "0" a portion of the dominant wave in addition to the delayed wave, so that part of the information about the reliable dominant wave having large power is discarded and replaced by tentatively demodulated information. Because of this, improvement is not necessarily made as far as the dominant wave is concerned.

The method described in (3) modifies a portion of the dominant wave in addition to a delayed wave, so that this method is advantageous when the dominant wave is not predominant while the power of delayed waves is strong. For example, it is advantageous when the delay provide has a series of delay waves following the dominant wave having their power as strong as that of the dominant power (e.g., like in an equal gain model). Under the communication environment in which such a delay profile is observed, it is not preferable to employ the method of suppressing inter-carrier interference as described in (2). This is because information about the unreliable dominant wave is treated without any modification as if it was reliable information.

In consideration of this, it appears preferable that the interference removal methods as described above be switched according to the communication status. A receiver apparatus described in the following selects either the interference removal method (2) or the interference removal method (3) based on the delay profile.

Figure 8:
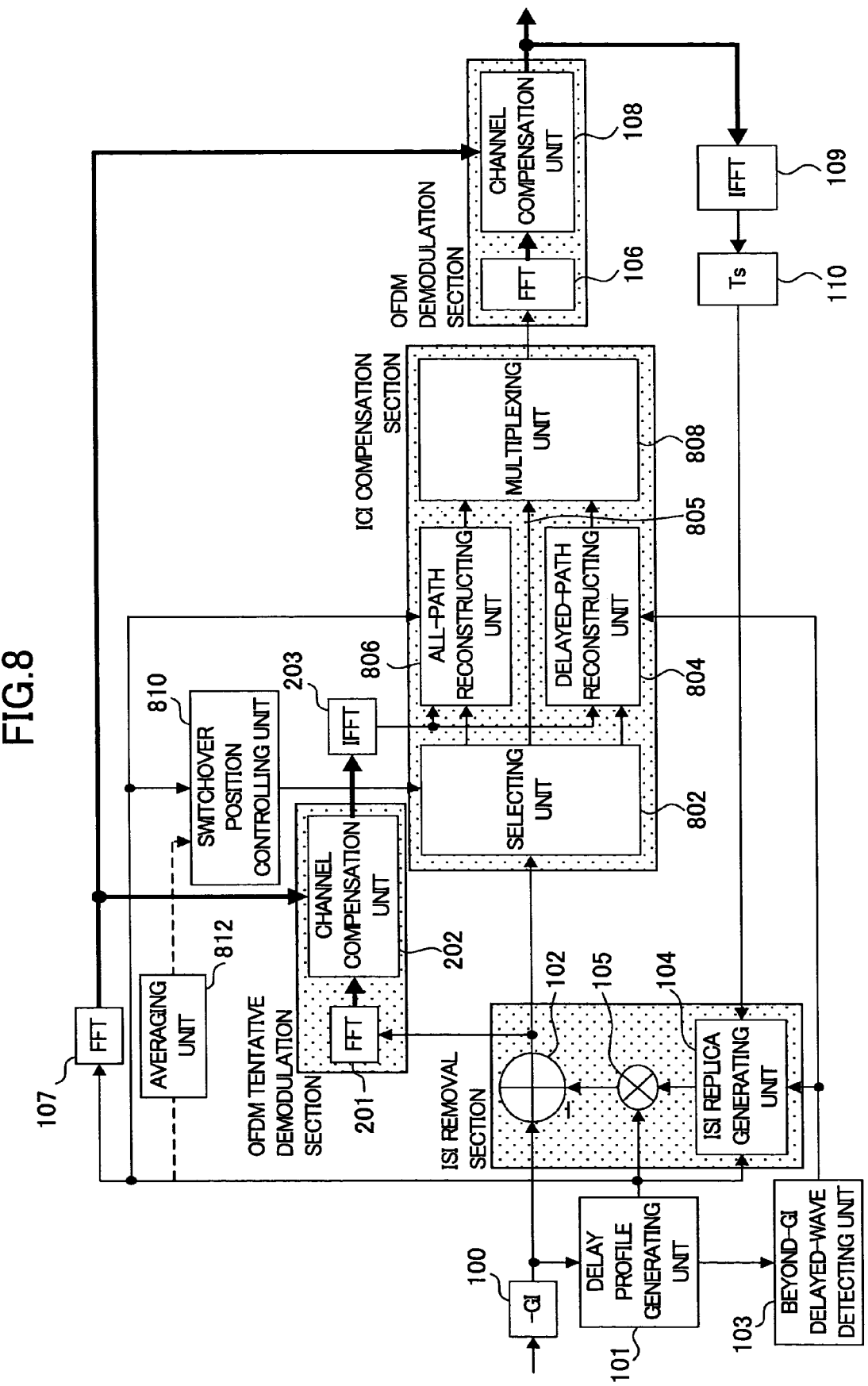
FIG. 8 is a block diagram showing a portion of the receiver apparatus according to an embodiment of the present invention.

FIG. 8 is a block diagram showing a portion of the receiver apparatus according to an embodiment of the present invention. In addition to the elements already described in connection with FIGS. 1, 4, and 6, the receiver apparatus includes a selecting unit 802, a delayed-path reconstructing unit 804, an all-path reconstructing unit 806, a multiplexing unit 808, and a switchover position controlling unit 810. Those elements which have already been described will not be further described.

The selecting unit 802 couples the output of the subtracting unit 102 to a selected one of the delayed-path reconstructing unit 804, the all-path reconstructing unit 806, and a signal line 805 in response to a control signal from the switchover position controlling unit 810.

The delayed-path reconstructing unit 804 removes inter-carrier interference by modifying a delayed wave without modifying the dominant wave as described in (2).

The all-path reconstructing unit 806 removes inter-carrier interference by modifying both the dominant wave and a delayed wave as described in (3).

The multiplexing unit 808 operates in association with the selecting operation of the selecting unit 802, and supplies one of the output of the delayed-path reconstructing unit 804, the output of the signal line 805, and the output of the all-path reconstructing unit 806 to the fast Fourier transform unit 106, which has already been described.

The switchover position controlling unit 810 supplies the control signal for selecting a suitable inter-career interference removal method to the selecting unit 802 based on the delay profile supplied from a delay profile generating unit 101.

Figure 9:
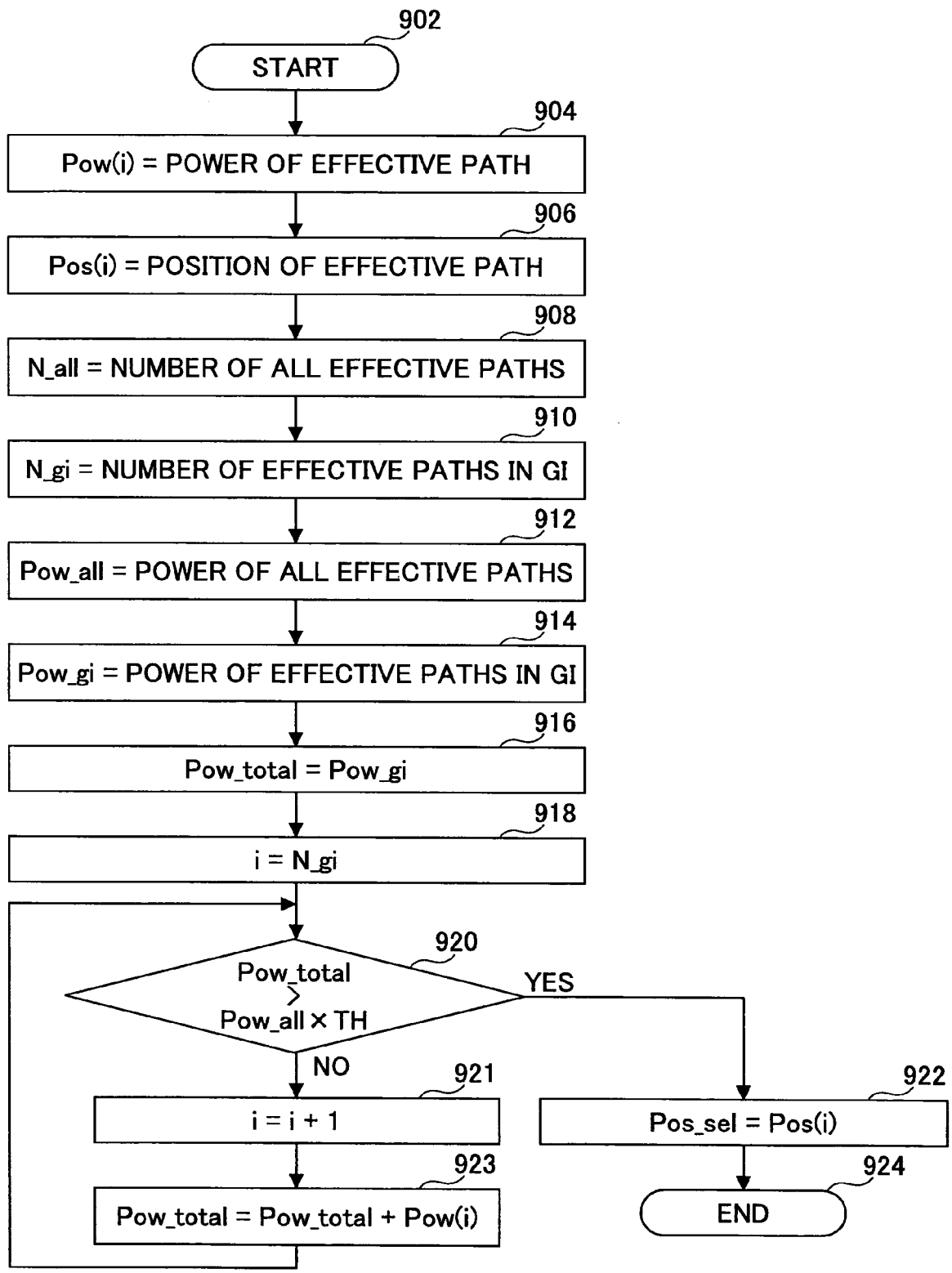
FIG. 9 is a flowchart showing an example of an operation performed by a switchover position controlling unit.

FIG. 9 is a flowchart showing an example of the operation performed by the switchover position controlling unit. The flow begins with step 902, and proceeds to step 904.

At step 904, the signal power Pow(i) of an effective path detected in the received signal is measured within the predetermined timeframe such as an FFT window (W), for example. This detection process is performed by making a threshold check (for example, a path is ascertained to be present in samples if the signal power of these samples is within a predetermined power margin range from the peak power). Here, "i" is a parameter for discriminating paths.

At step 906, the timing at which an effective path appears is identified as Pos(i).

At step 908, a total number of the effective paths is represented as N_all.

At step 910, the number of paths within the guard interval relative to the dominant wave is represented as N_gi.

At step 912, the total signal power of all the paths is represented as Pow_all.

At step 914, the total signal power of the paths within the guard interval is represented as Pow_gi.

At step 916, the total signal power Pow_gi of the paths within the guard interval is given as Pow_total, which is a parameter regarding the power of desired waves.

At step 918, parameter i is set to N_gi.

At step 920, a check is made as to whether Pow_total>(Pow_all)(TH) is satisfied. Here, TH is a predetermined threshold value, and is ½ (=0.5) in this embodiment. Alternatively, this threshold may be set to another value as long as it is greater than 0 and smaller than 1. If the above condition is satisfied, the procedure goes to step S922. Otherwise, the procedure goes to step 921.

At step 921, the value of the parameter i is incremented.

At step 923, the signal power Pow(i) of the i-th path is added to Pow_total, and the procedure returns to step 918.

At step 922 (when the above-identified condition is satisfied at step 920), the timing Pos(i) of the i-th path is given as Pos_sel, which is the timing (system switchover timing) at which the inter-carrier interference removal methods are switched. The contents of this setting are transmitted to the selecting unit 802 of FIG. 8 via the control signal. The selecting unit 802 selects a proper interference removal method in response to the switchover timing Pos_sel and the sample position Pos(N_all) of the maximum delayed wave. The selecting unit 802 selects the all-path reconstructing method (806) for the samples from the first sample to Pos_sel. The selecting unit 802 selects the unprocessed signal option (i.e., the signal line 805) after the sample position of the maximum delayed wave. For other samples, the selecting unit 802 selects the delayed-wave reconstructing method (804).

Thereafter, the procedure comes to an end at step 924

Figure 10A:
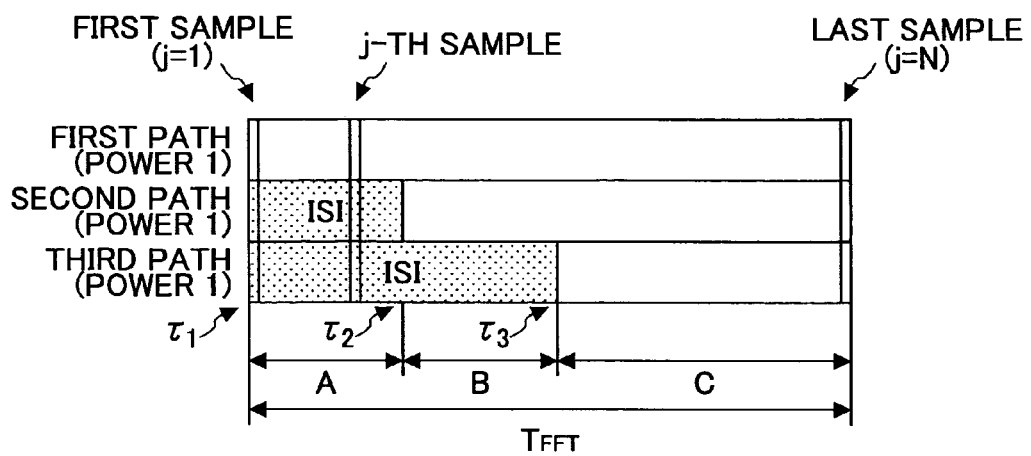
FIGS. 10A through 10C are illustrative drawings for explaining the operation of a selecting unit and a switchover position controlling unit shown in FIG. 8.
Figure 10B:
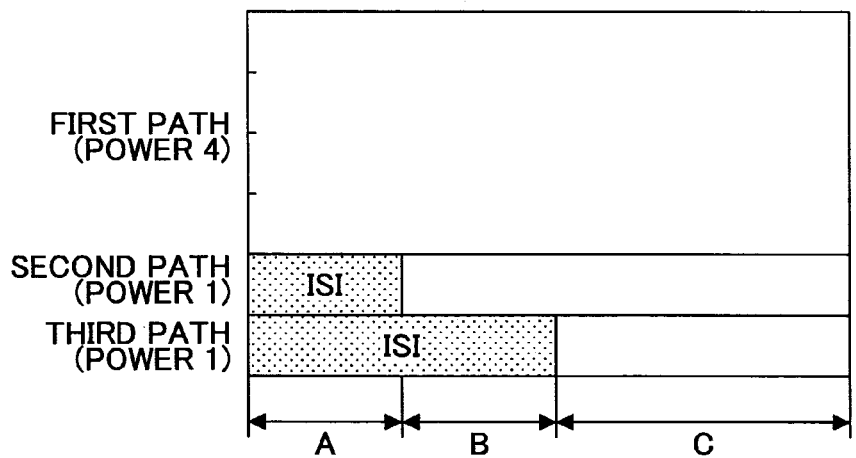
Figure 10C:
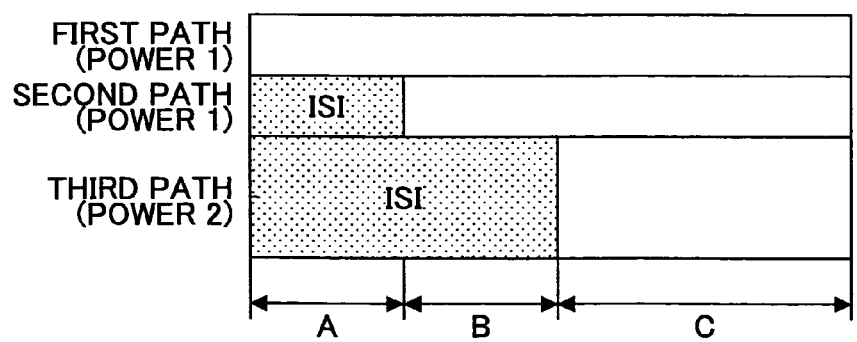

FIGS. 10A through 10C are illustrative drawings for explaining the operation of the selecting unit 802 and the switchover position controlling unit 810 shown in FIG. 8. For the sake of simplicity, it is assumed that a single dominant wave (first path) and two delayed waves (second and third paths) are included in the received signal. In the receiver apparatus, samples are successively demodulated for a predetermined duration (FFT window width $T_{FFT}$) following the guard interval included in the symbols subject to demodulation. After the demodulation, inter-symbol interference and inter-carrier interference are compensated for by the methods as described above. In the case of the compensation of inter-carrier interference, either the all-path reconstructing method or the delayed-path reconstructing method is selected to compensate for inter-carrier interference, depending on the signal power of the received dominant wave and delayed waves.

In FIG. 10A, a ratio of the power of each path is 1:1:1. In a period A, two thirds of the total signal power is causing inter-symbol interference, which is attributable to the second and third paths. The period A of the second path corresponds to a portion that is modified to "0" by the inter-symbol interference removal method as described in (1). The periods A and B of the third path also correspond to a portion that is modified to "0" by the inter-symbol interference removal method as described in (1). The receiver apparatus demodulates samples successively from the first sample (j=1) following the guard interval to the last sample (j=N) while performing ISI and ICI compensation. N represents the total number of samples constituting a single symbol.

In the following, a description will be given of how the switchover timing (method switch timing) of inter-carrier interference removal methods is set in the case of FIG. 10A. Parameters shown in an illustrated example are set as follows.

Effective Path Signal Power:
Pow(1)=Pow(2)=Pow(3)=1
Effective Path Position:
Pos(1)=$\tau_1$, Pos(2)=$\tau_2$, Pos (3)=$\tau_3$
Number of Effective Paths:
N_all=3
Number of Effective Paths in Guard Interval:
N_gi=1
Power of All the Effective Paths:
Pow_all=Pow(1)+Pow(2)+Pow(3)=3
Power of Effective Paths in Guard Interval:
Pow_gi=Pow(1)=1.

In the case of i=Ng_i=1, the left-hand side and the right-hand side of the inequality at step 920 are as follows.
Left-hand Side=Pow_total=1
Right-hand Side=Pow_all×TH=3×0.5=1.5

As a result, a check result indicates "NO". The parameter i is thus incremented so that i=2. At step 923, Pow(2) is added to Pow_total for update at step 923. At step 920, the inequality is evaluated again.
Left-hand Side=Pow_total=2
Right-hand Side=Pow_all×TH=3×0.5=1.5.

As a result, a check result indicates "YES". At step 922, the switchover timing is given as follows.
Pos_sel=Pos(2)=$\tau_2$ The switchover position controlling unit 810 notifies the selecting unit 802 of $\tau_2$ as the switchover timing of inter-career interference removal methods. The timing computed in this manner indicates the timing at which a proportion of the power of desired waves in the total power of the received signal exceeds the threshold value ½.

With reference to FIG. 10A, the receiver apparatus suppresses inter-carrier interference by use of the all-path reconstructing method (806) from the first sample (j=1) to the sample at the timing $\tau_2$ (i.e., during the period A). There is no inter-subcarrier interference with respect to samples after the sample position $\tau_3$ of the maximum delayed wave (i.e., during the period C). The selecting unit 802 thus selects the signal line 805 to transmit a signal to the subsequent processing stage. In the period B other than the periods described above, the delayed-wave reconstructing method (804) is selected.

In the following, the case shown in FIG. 10B will be described. In this case, parameters are set as follows.
Effective Path Signal Power:
Pow(1)=4, Pow(2)=Pow(3)=1
Power of All the Effective Paths:
Pow_all=Pow(1)+Pow(2)+Pow(3)=6

Other parameters are the same as those in the case of FIG. 10A. In this case, a ratio X of the power of desired waves to the total power is 4/6, 5/6, and 1 for the periods A, B, and C, respectively. As a result, the method switchover timing is $\tau_1$. With reference to the flowchart of FIG. 9, this will be described as follows.

In the case of i=Ng_i=1, the left-hand side and the right-hand side of the inequality at step 920 are as follows.
Left-hand Side=Pow_total=4
Right-hand Side=Pow_all×TH=6×0.5=3

As a result, a check result indicates "YES". At step 922, thus, the switchover timing Pos_sel=Pos (1)=$\tau_2$.

The receiver apparatus selects the all-path reconstructing method (806) from the first sample to the sample at the timing $\tau_1$. Since the first sample coincides with $\tau_1$, the all-path reconstructing method is never performed. With respect to samples after the sample position $\tau_3$ of the maximum delayed wave (i.e., during the period C), the selecting unit 802 selects the signal line 805 to transmit a signal to the subsequent processing stage. In the other periods A and B, the delayed-wave reconstructing method (804) is selected.

In the following, the case shown in FIG. 10C will be described. In this case, parameters are set as follows.
Effective Path Signal Power:
Pow(1)=Pow(2)=1, Pow(3)=2
Power of All the Effective Paths:
Pow_all=Pow(1)+Pow(2)+Pow(3)=4

Other parameters are the same as those in the case of FIG. 10A. In this case, a ratio X of the power of desired waves to the total power is 1/4, 2/4, and 1 for the periods A, B, and C, respectively. As a result, the method switchover timing is $\tau_3$. With reference to the flowchart of FIG. 9, this will be described as follows.

In the case of i=Ng_i=1, the left-hand side and the right-hand side of the inequality at step 920 are as follows.
Left-hand Side=Pow_total=1
Right-hand Side=Pow_all×TH=4×0.5=2

As a result, a check result indicates "NO". It follows that the parameter i is incremented to become 2. At step 923, Pow(2) is added to Pow_total for update. At step 920, the inequality is evaluated again.
Left-hand Side=Pow_total=2
Right-hand Side=Pow_all×TH=4×0.5=2

A check result still indicates "NO". It follows that the parameter i is incremented to become 3. At step 923, Pow(3) is added to Pow_total for update. At step 920, the inequality is evaluated again.
Left-hand Side=Pow_total=4
Right-hand Side=Pow_all×TH=4×0.5=2

As a result, a check result indicates "YES". At step 922, thus, the switchover timing is set as follows.
Pos_sel=Pos(3)=$\tau_3$ The receiver apparatus selects the all-path reconstructing method (806) from the first sample to the sample at the timing $\tau_3$ (i.e., during the periods A and B). With respect to samples after the sample position $\tau_3$ of the maximum delayed wave (i.e., during the period C), the selecting unit 802 selects the signal line 805 to transmit a signal to the subsequent processing stage. In other periods, the delayed-wave reconstructing method (804) should be selected. There are no such periods in this example, so that the delayed-wave reconstructing method is never used.

Figure 11:
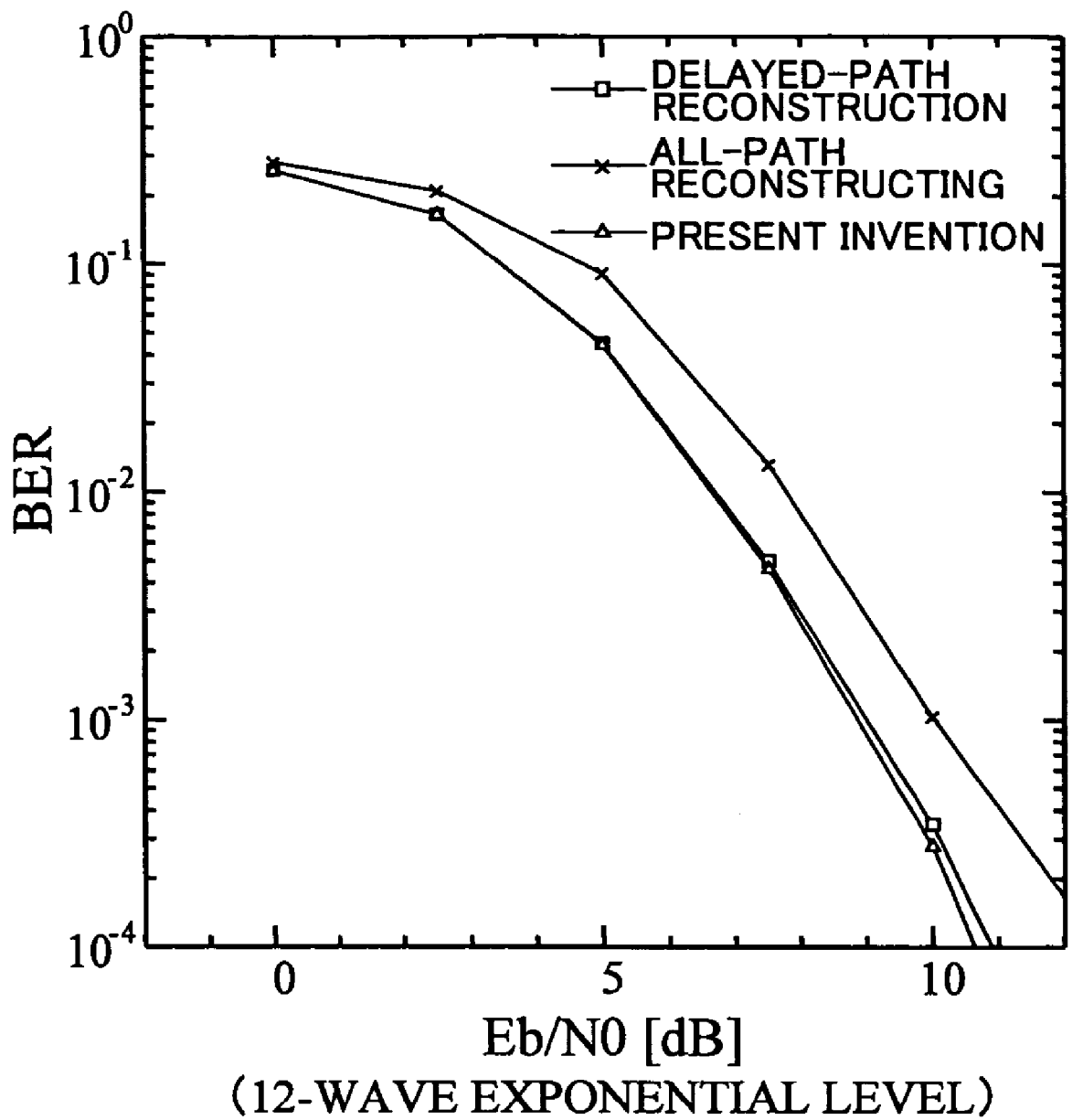
FIG. 11 is a diagram showing the results of simulation of the embodiment of the present invention.
Figure 12:
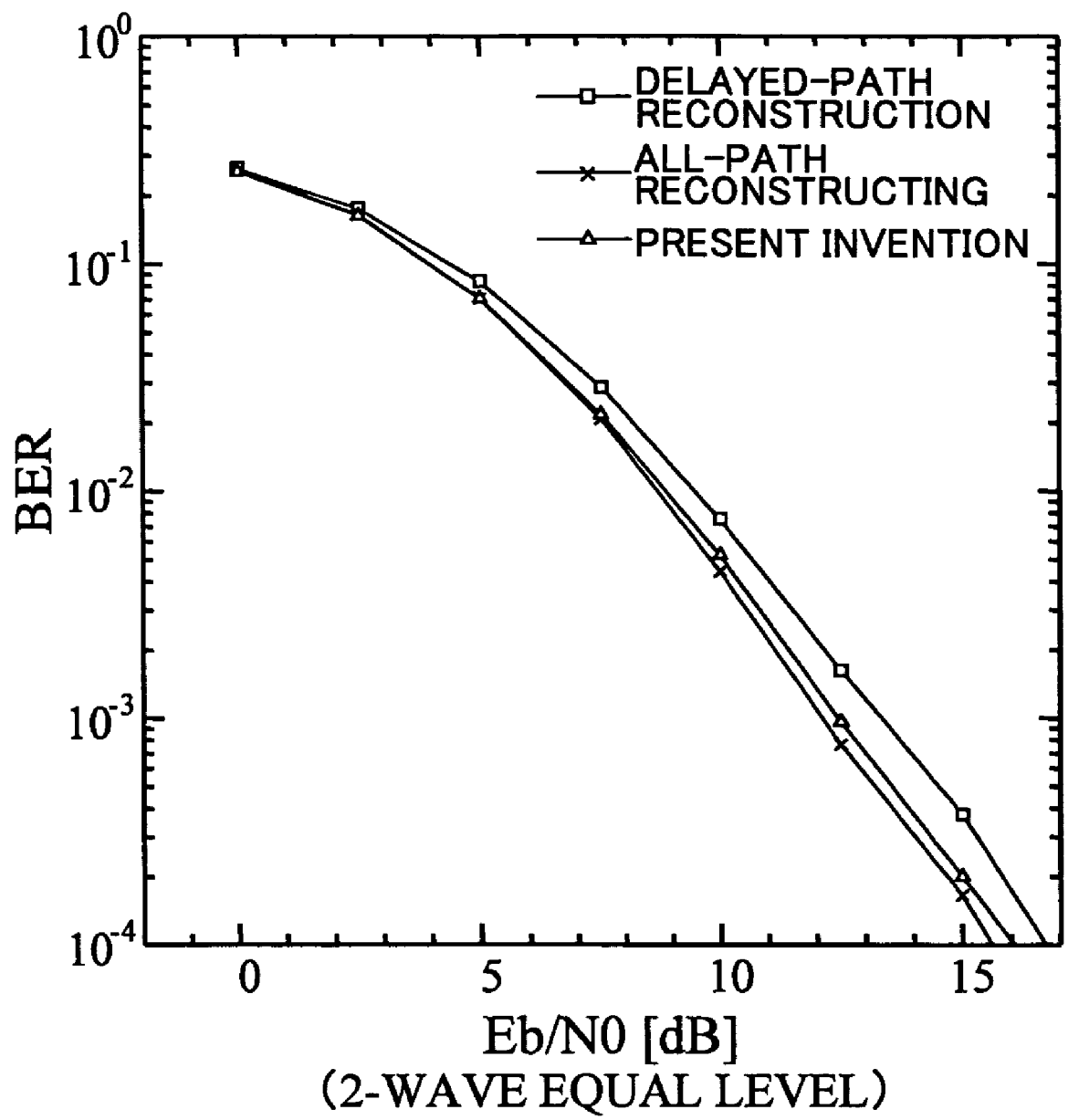
FIG. 12 is a diagram showing the results of simulation of the embodiment of the present invention.

FIG. 11 and FIG. 12 are diagrams showing the results of simulation of the embodiment of the present invention. In the results of simulation shown in the figures, the horizontal axis represents a signal-to-noise ratio in terms of signal power to noise power ratio ($Eb/N_0$), and the vertical axis represents a bit error rate (BER). The simulation shown in FIG. 11 employs the path model (12-path exponential decay) in which 12 delayed waves included in the received signal have their power gradually decreasing in an exponential manner. The simulation shown in FIG. 12 employs the path model (2-path with equal power) in which the dominant wave and delayed wave included in the received signal have comparable powers. Parameters used in the simulations are as follows.

Number of FFT/IFFT points: 1024
Number of Subcarriers Used: 896
Number of Samples in One OFDM Simple: 1224 (200 of which are guard intervals)
Modulation Method: 16QAM
Reception System: 2-branch diversity Reception
Maximum Doppler Frequency: 960 Hz
Threshold for Switchover of Carrier Interference Suppressing Methods (TH): 0.5

Each of FIG. 11 and FIG. 12 illustrates a case in which the delayed-wave reconstructing method alone is used ("□"), a case in which the all-path reconstructing method alone is used ("x"), and a case (the present invention) in which these methods are switched according to switchover conditions based on the threshold value "0.5" ("Δ"). As illustrated, satisfactory estimation results with smaller bit error rates are obtained with respect to either path model by use of the present invention.

According to at least one embodiment of the present invention as described above, the methods of suppressing intercarrier interference are adaptively switched in response to a ratio of the power of desired waves to the total power. Alternatively, the power of undesired waves such as the power of interfering waves may be used for selecting a method in place of the power of desired waves. The threshold value for evaluating the power ratio may be set to a fixed value, or may be modified according to the state of communication. In the latter case, an averaging unit (812 of FIG. 8) for averaging out delay profiles for a plurality of frames may be provided in the receiver apparatus, for example. This makes it possible to change the threshold value according to the statistical characteristics of the average delay profile.

Further, the present invention is not limited to these embodiments, but various variations and modifications may be made without departing from the scope of the present invention.

What is claimed is:

1. An receiver apparatus according to an OFDM system, comprising:
    an inter-symbol interference suppressing unit configured to modify to a predetermined content a portion of a dominant wave included in a received signal and to modify to a predetermined content a portion of at least one delayed wave included in the received signal;
    a tentative demodulation unit configured to demodulate a signal inclusive of the unmodified dominant wave and the modified delayed wave according to the OFDM system so as to output a tentatively demodulated target symbol; and
    an inter-carrier interference suppressing unit,
    wherein said inter-carrier interference suppressing unit includes:
        a first unit configured to further modify the modified portion of the modified delayed wave in response to the tentatively demodulated target symbol;
        a second unit configured to further modify the modified portion of the modified dominant wave and the modified portion of the modified delayed wave in response to the tentatively demodulated target symbol; and
        a selecting unit configured to select one of the first unit and the second unit in response to a delay profile.

2. The receiver apparatus as claimed in claim 1, wherein said inter-symbol interference suppressing unit includes:
    a unit configured to modify to a predetermined content a portion of a target symbol subject to demodulation in the dominant wave included in the received signal; and
    a unit configured to modify to a predetermined content a portion of a preceding symbol adjacent to the target symbol subject to demodulation in the delayed wave included in the received signal.

3. The receiver apparatus as claimed in claim 1, wherein said selecting unit performs said selecting by comparing a ratio of a power of desired waves to a power of undesired waves in the received signal with a threshold value.

4. The receiver apparatus as claimed in claim 3, wherein said selecting unit selects said first unit in response to an event that the power of undesired waves is lower than half a total power of the received signal.

5. The receiver apparatus as claimed in claim 3, wherein said selecting unit selects said second unit in response to an event that the power of undesired waves is higher than half a total power of the received signal.

6. The receiver apparatus as claimed in claim 3, wherein the threshold value is modified in response to a statistical characteristic of the delay profile.

7. The receiver apparatus as claimed in claim 1, further comprising an averaging unit configured to average out delay profiles generated based on the received signal to supply the delay profile to said selecting unit.

8. The receiver apparatus as claimed in claim 1, wherein said selecting unit includes a unit configured to select a timing from start timings of the dominant wave and the delayed wave such that a proportion of a power of desired waves in a total power exceeds a threshold value at the selected timing.

9. The receiver apparatus as claimed in claim 8, wherein said selecting unit selects said first unit to demodulate samples from the selected timing to a start timing of a maximum delayed wave.

10. The receiver apparatus as claimed in claim 8, wherein said selecting unit selects said second unit to demodulate samples until the selected timing.

* * * * *

UNITED STATES PATENT AND TRADEMARK OFFICE
CERTIFICATE OF CORRECTION

PATENT NO. : 7,526,042 B2  
APPLICATION NO. : 10/995814  
DATED : April 28, 2009  
INVENTOR(S) : Yoshida Page 1 of 1

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 683 days Delete the phrase "by 683 days" and insert -- by 747 days --

Signed and Sealed this

Twentieth Day of October, 2009

David J. Kappos  
*Director of the United States Patent and Trademark Office*